D. A. JOHNSON.
Attaching Hubs to Axles.
No. 147,503. Patented Feb. 17, 1874.
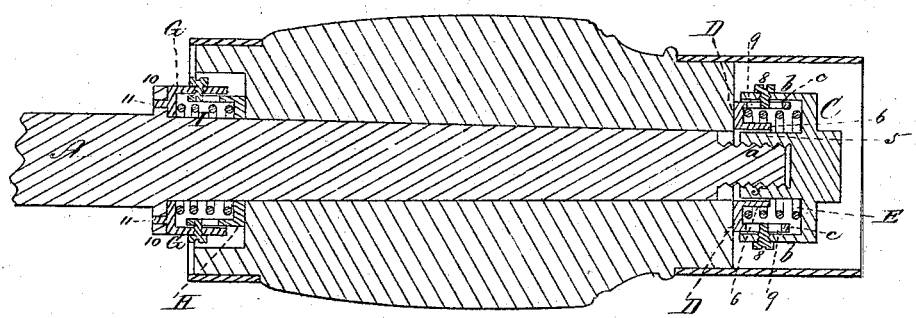
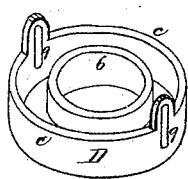 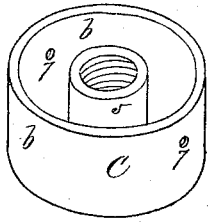 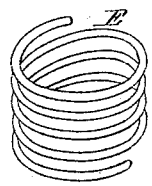
Witnesses:
Inventor:
Daniel A. Johnson

UNITED STATES PATENT OFFICE.

DANIEL A. JOHNSON, OF BOSTON, MASSACHUSETTS.

IMPROVEMENT IN ATTACHING HUBS TO AXLES.

Specification forming part of Letters Patent No. 147,503, dated February 17, 1874; application filed October 21, 1873.

*To all whom it may concern:*

Be it known that I, DANIEL A. JOHNSON, of Boston, in the county of Suffolk and State of Massachusetts, have invented an Improved Method of Securing Wheels to their Axles, of which the following is a full, clear, and exact description, reference being had to the accompanying drawings making part of this specification, in which—

Figure 1 is a longitudinal central section through a hub of a carriage-wheel with my improvements applied thereto. Fig. 2 is a perspective view of my improved washer. Fig. 3 is a view of the nut adapted to receive the same. Fig. 4 is a view of the spring placed between them.

In carriages as ordinarily constructed, the wheel is secured to the axle by means of a nut and washer, the inner end of the journal being provided with a collar, against which fits the inner end of the hub of the wheel. This washer, which is usually of leather, soon wears away, and the lateral play of the wheel on the axle occasions an incessant rattling, to obviate which it becomes necessary to frequently replace the washer.

To overcome this difficulty is the object of my invention, which consists in interposing a spring between the collar of an axle and its nut, whereby the ordinary leather washer is dispensed with, and the wear and rattling incident to the play of the wheel on the axle are avoided.

To enable others skilled in the art to understand and use my invention, I will proceed to describe the manner in which I have carried it out.

In the said drawings, A represents the axle of a carriage, upon which revolves the wheel, the axle being provided at its outer end with a screw-thread, $a$, over which is turned a nut, C, provided with a lip or flange, $b$, which fits over a washer, D, having a flange, $c$, a spiral spring, E, being interposed between the nut and the washer, the spring being kept from moving laterally by a projection, 5, on the nut, and a projection, 6, on the washer. The nut is provided with two holes, 7, diametrically opposite each other, for the passage of pins or screws 8, which enter slots 9 in the flange of the washer, by which construction the washer and nut are made to turn together, and the lateral play of the wheel on the axle is avoided, the looseness of the parts incident to the wear of the hub of the wheel against the collar 10 of the axle being immediately taken up by the spring, which constantly exerts a lateral pressure between them.

By my invention, the frequent turning of the nut against the leather washer, as it wears away, is avoided, the expansion of the spring compensating therefor.

If desired, a sleeve, G, provided with projections 11, fitting into the collar 10 of the axle, and a washer, H, and spring I, similar to the washer D and spring E, may be employed, to still further prevent the lateral play of the hub of the wheel on its axle.

I claim—

The washer D, in combination with the nut C and spring E, substantially as and for the purpose described.

Witness my hand this 16th day of October, A. D. 1873.

DANIEL A. JOHNSON.

In presence of—
P. E. TESCHEMACHER,
W. J. CAMBRIDGE.